United States Patent [19]

Walling

[11] Patent Number: 5,360,998
[45] Date of Patent: Nov. 1, 1994

[54] MAGNETIC FIELD MINIMIZATION IN POWER TRANSMISSION

[75] Inventor: Reigh A. Walling, Clifton Park, N.Y.

[73] Assignee: General Electric Company, Schenectady, N.Y.

[21] Appl. No.: 677,090

[22] Filed: Mar. 29, 1991

[51] Int. Cl.[5] ............................................. H04B 3/30
[52] U.S. Cl. ...................................... 307/91; 174/32; 307/147; 307/326; 333/12; 361/107
[58] Field of Search .................................. 307/89–91, 307/326, 327, 11–13, 101, 104, 147; 174/32–34, 36, 40 R, 43, 44, 45 R; 333/12; 361/146, 107

[56] References Cited

U.S. PATENT DOCUMENTS

| | | | |
|---|---|---|---|
| 874,209 | 12/1907 | Kitsee | 307/148 |
| 1,782,875 | 11/1930 | Herz | 307/90 |
| 1,938,732 | 12/1933 | Vaage | 307/90 |
| 2,075,927 | 4/1937 | Bowen | 307/90 |
| 2,086,603 | 7/1937 | Cash | 307/90 |
| 2,214,134 | 9/1940 | Herz | 307/90 |
| 4,142,178 | 2/1979 | Whyte et al. | 307/149 |

OTHER PUBLICATIONS

"Constraints on Mitigating Magnetic Fields on Distribution Systems", James Burke, *Power Technologies Inc.*, pp. 1–12, 1990 IEEE Power Engineering Society Summer Meeting.

"Mitigation of Buried Pipeline Voltages Due to 60 Hz AC Inductive Coupling", Taflove, IEEE Transactions on Power Apparatus and Systems, vol. PAS-98, No. 5, Sep./Oct. 1979, pp. 1806–1823.

"Transmission Line Reference Book", Electric Power Research Institute EL-2500, 1982, Chapter 8, Field Effects of Overhead Transmission Lines and Stations, Deno and Zaffanella, pp. 329–419.

*Primary Examiner*—A. D. Pellinen
*Assistant Examiner*—Richard T. Elms
*Attorney, Agent, or Firm*—Nixon & Vanderhye

[57] ABSTRACT

A series-capacitance compensated shielding circuit is located physically adjacent and parallel to a polyphase power transmission line for the purpose of partially cancelling the electromagnetic fields created by current flow through the transmission line. The shielding circuit forms a loop circuit around substantially the entire transmission line or a portion thereof, and is positioned such that a current is induced therein by the magnetic field produced by the alternating currents in the transmission line. Such induced current is tuned by the series capacitance to produce an optimized cancelling magnetic field, thus reducing the net electromagnetic fields created by the power lines along a right-of-way.

23 Claims, 9 Drawing Sheets

MAGNETIC FIELD MINIMIZATION IN POWER TRANSMISSION

FIELD OF THE INVENTION

The disclosed exemplary embodiments relate to compensated shielding circuits for use with polyphase transmission or distribution lines for the purpose of reducing the net electromagnetic fields created by the power lines.

BACKGROUND AND SUMMARY OF THE INVENTION

Shielding circuits for the purpose of counteracting magnetic fields in power circuits are known as are the use of compensating circuits for minimizing power circuit impedance. Additionally, it is known to use insulating devices, pipe line extensions, as well as various pipe line grounding methods, for the purpose of reducing voltages induced on gas transmission pipe lines by 60 Hz AC power transmission lines sharing a joint right-of-way as indicated by Taflove et al "Mitigation of Buried Pipe Line Voltage Due to 60 Hz AC Inductive Coupling", *IEEE Transactions on Power Apparatus and Systems*, Volume PAS-98, pages 1806–1823, September-/October 1979.

Power utility companies, however, have been faced with the need for increased transmission system capacity while simultaneously challenged by increased public concern as to the possible effects of electric and magnetic fields produced by transmission lines. That is to say, the need for increased power transmission and distribution capacity is present along with the difficulties and expense involved in the acquisition of new transmission right-of-ways that typically produce substantial public opposition. Thus increasing power transmission capabilities over existing right-of-ways is often the only visible manner of supplying increased customer power requirements. In addition, where new transmission lines are constructed, means for minimizing associated magnetic fields must be provided to facilitate compliance with regulatory requirements.

The possible health and environmental effects, if any, of the increased electromagnetic field created by increased current at power line frequency through such transmission and distribution lines is, of course, a concern to the electric power utilities, regulatory agencies, as well as the general public. In fact, certain jurisdictions have placed limits on the magnetic field levels which can be created by a power line. Accordingly, there is a need to develop a means for allowing increased power transfer over an existing right-of-way without increasing the magnetic and electric field intensities outside such right-of-ways; similarly, a new transmission line can be added while minimizing associated magnetic fields.

The object of the disclosed exemplary embodiments is that of providing effective shielding conductors between the power circuits and the existing right-of-way edge in such a manner as to reduce such field levels, particularly electromagnetic field intensities. It is a still further object of the disclosed embodiments to accomplish such results without requiring the reconstruction of existing power lines or the modification of existing design standards in the construction of new power lines.

Briefly stated, I have discovered that the installation of a series-capacitance compensated shielding circuit located physically adjacent and parallel to a polyphase power transmission or distribution line partially cancels the electromagnetic fields created by the passage of power frequency current through the lines, thus reducing the net electromagnetic fields created by such lines outside a right-of-way. Such a passive shielding scheme can provide up to about an 80% reduction of the magnetic field at the right-of-way edges for typical existing transmission lines. My shielding scheme additionally provides a 20–40% decrease in electric field intensity at the edge of the right-of-way.

BRIEF DESCRIPTION OF THE DRAWINGS

These, as well as other objects and advantages of this invention will be more completely appreciated by carefully studying the following detailed description of a presently preferred exemplary embodiment of this invention in conjunction with the accompanying drawings in which.

DETAILED DESCRIPTION OF THE DRAWINGS

The exemplary embodiment of my compensated shield circuit scheme for use with electric power transmission and distribution lines includes the installation of a series-capacitance compensated shielding circuit physically located adjacent and parallel to a three-phase distribution line wherein the circuit partially cancels the electromagnetic fields created by the passage of current through the transmission line, thus reducing the net electromagnetic fields created by the power line.

Figure 1:
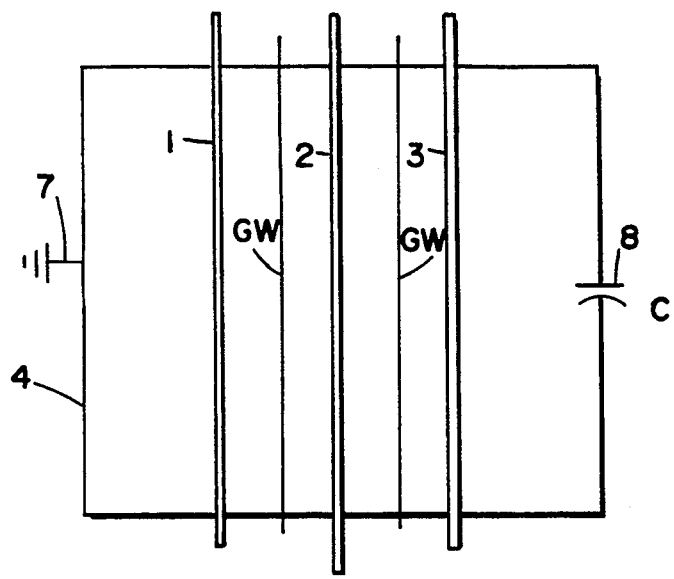
FIG. 1 is a top view of a portion of a three-phase transmission line including a schematic of the electrical configuration of the shield circuit.
Figure 2:
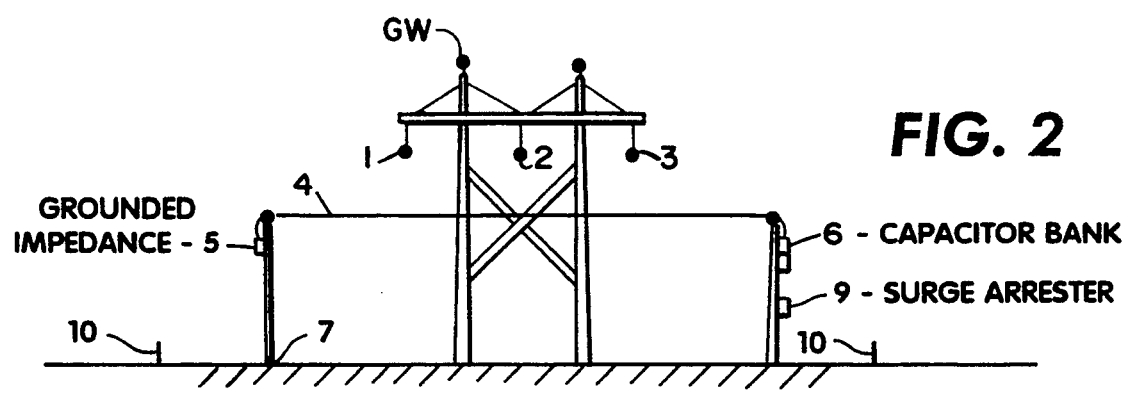
FIG. 2 shows a partial physical implementation of the shielding circuit in relation to the three-phase transmission line of FIG. 1.
Figure 3:
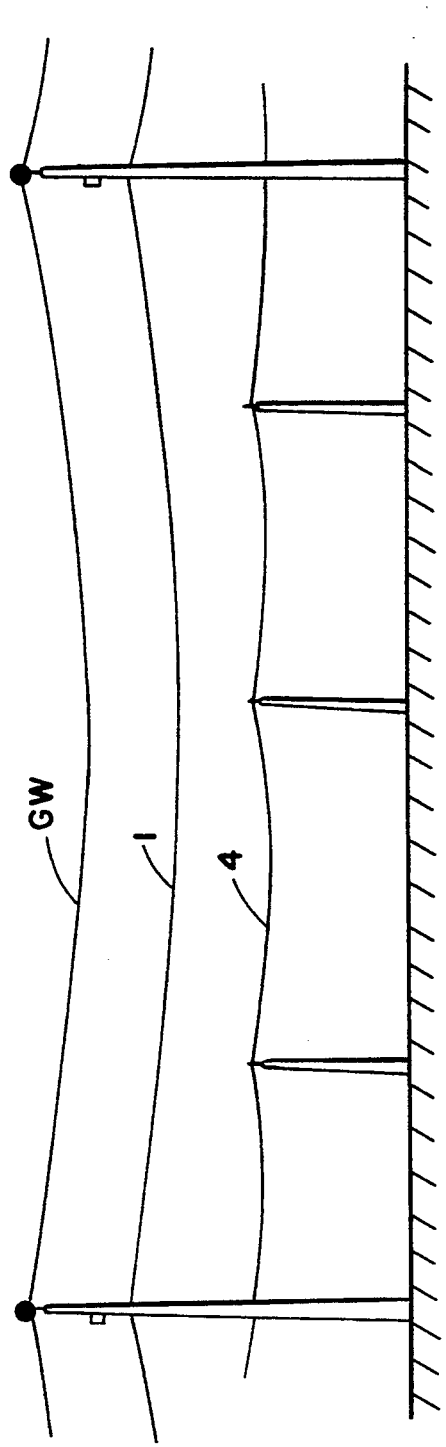
FIG. 3 illustrates in side elevation a partial physical implementation of the shielding circuit in relation to the transmission line.

An exemplary such system is illustrated in the three views shown in FIGS. 1 through 3 which, for example, may be a 345 kilovolt transmission circuit on a 150 foot right-of-way with edges or longitudinal sides as illustrated at 10 of FIG. 2 comprising three phase conductors 1, 2 and 3 having a design current of 2380 amps per phase. The lines are arranged in a conventional horizontal construction and with H-frame configuration with two multiple-grounded lightning shield wires GW.

The shield circuit includes one or more electrically parallel conductors 4 of the configuration shown, which encircle either an entire power transmission line or a portion thereof. Such conductors are lightly insulated and in the longitudinal power line direction are located approximately half the distance between the right-of-way edge and the adjacent power line. The shield wires are also substantially parallel with the power lines along the right-of-way and, as illustrated, are connected so as to form a loop circuit in which the magnetic field produced by the alternating currents in the transmission line please conductors 1, 2 and 3 induce a current. That is to say, the induced current flow in the shield circuit which may extend over the length of the power lines or a portion thereof is in proportion to the power circuit current flow and is produced without the addition of any external source or control device.

The shield circuit is electrically insulated from earth except at discrete points, as well as being insulated from all of the power line conductors. The preferred embodiment described herein is grounded at only one point, although multiple grounds can be utilized. At the ground point 7, the shield circuit may be directly connected to earth ground or may be grounded through an impedance generally illustrated at 5, for example, which is selected to limit shield circuit ground fault current. In the preferred embodiment shown in FIG. 1, the ground point 7 is located at the longitudinal midpoint on one side of the right-of-way, and the compensating capacitor 8 is located electrically opposite the ground at the longitudinal midpoint on the other side of the right-of-way. This configuration minimizes shield-to-ground voltages and minimizes compensating capacitor overstress in the event of shield circuit ground faults.

In series with the conductors 4 of the shield circuit a capacitor or bank of capacitors may be connected, as generally illustrated at 6 of FIG. 2. The capacitor(s) is selected to have a capacitive reactance at the power fundamental frequency so that the net shield circuit loop impedance is optimized so that the magnetic field due to shield current flow is in maximum opposition to the magnetic field created by the power line at the edge of a right-of-way.

As an additional protective feature, an over voltage limiting device may be incorporated in parallel with the capacitor(s) for the purpose of protecting against excess voltage during power system faults and the like. An exemplary such device would be in the form of a surge arrestor or a spark gap device 9.

As may be seen from the following analysis, magnetic field reductions of about 60–80% can be practically achieved along the edge of power line right-of-ways through the use of the disclosed compensated shielding circuits. Such shielding also provides about 20–40% decrease in electric field intensity at the edge of the right-of-way. The latter decrease, however, is not as practical as the former for the purpose of increasing power transfer unless the power line is also upgraded to a higher standard voltage level.

As aforementioned, the exemplary embodiment of my compensated shield circuit includes lightly insulated conductors placed on the right-of-way in the manner illustrated in FIGS. 1 through 3 to form a loop circuit in which the magnetic field produced by the current of the transmission line phase conductors induces a current whereby the induced current can be significantly enhanced by using series capacitor compensation of the shield circuit's reactance. The magnetic field produced by the shield circuit current in turn partially counteracts the field produced by the power line currents.

Grounding of the shield circuit insures that the impedance voltage drop to ground caused by the circulating induced current will be relatively small, i.e., on the order of a few hundred volts per mile. Thus, in addition to allowing low voltage insulation to be used on the shield wires, grounding allows the shield circuit to additionally act as an electrostatic shield by partially cancelling the electric field appearing beyond the right-of-way.

Figure 4:
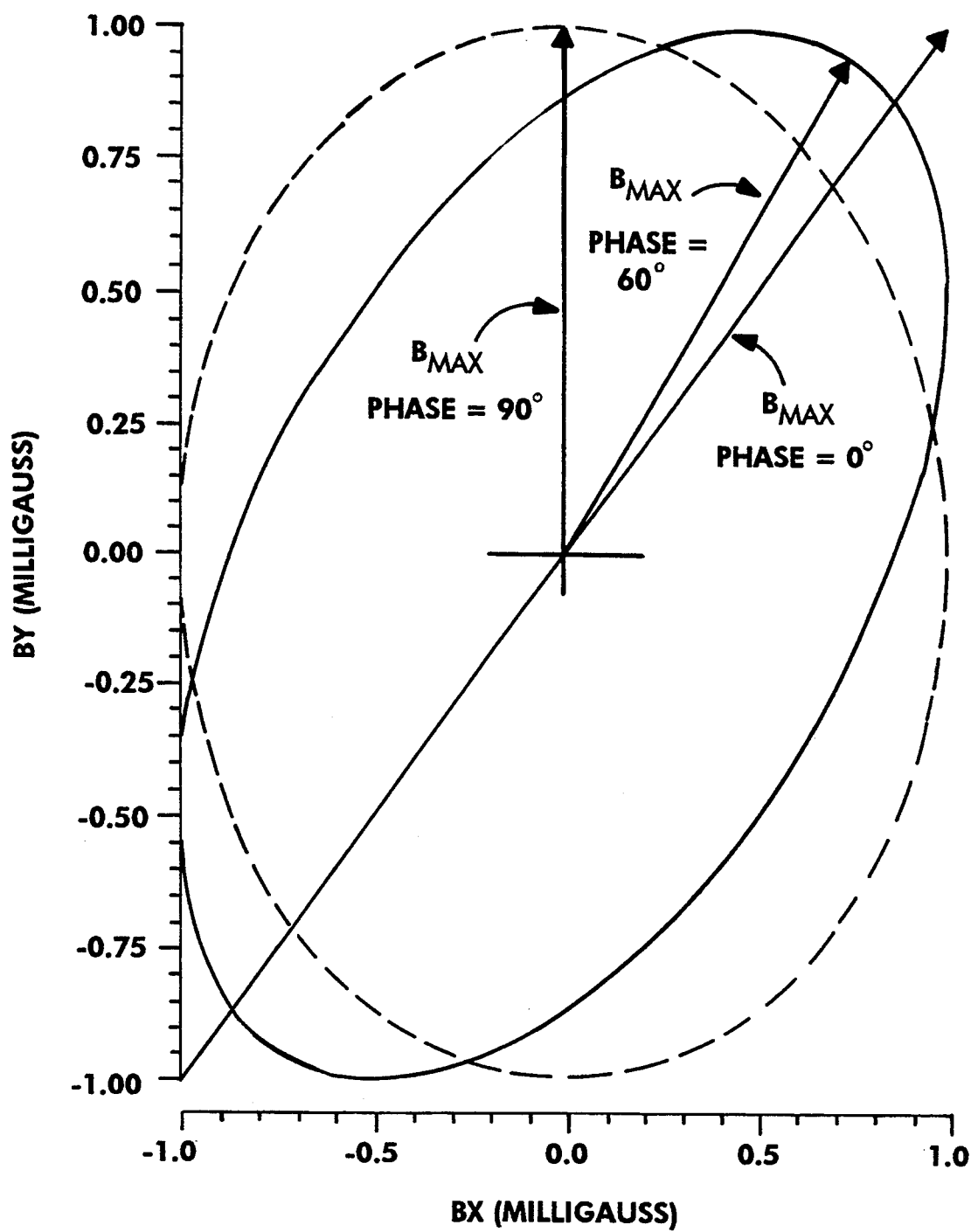
FIG. 4 illustrates three magnetic field vectors at the same point in space over one 60 Hz cycle with various phase angles between the X and Y components of the fields.

In the case of a single phase line the magnetic field includes a horizontal (X-axis) component, as well as a vertical (Y-axis) component, which exhibit sinusoidally varying magnitudes over a 60 Hz cycle. These components, however, are in phase with each other, and the resulting magnetic vector has a constant directional orientation but with a sinusoidal magnitude. The field produced by a three-phase line, however, is more complicated since the X and Y components are not in phase with each other, and the resulting field vector varies both in time and direction. As illustrated in FIG. 4, for example, the field vectors at the same point in space over one cycle will describe an ellipse, the shape of which is a function of the phase difference between the directional components and their relative magnitudes. The shape of the ellipse will vary from that approaching a straight line to that approaching a circle as the phase angle between the X and Y components varies from 0° to 90°, respectively.

Since the biological effects of magnetic fields at power line frequency, if any, are not known, no common or preferred definition of magnetic field magnitude has been established. That is to say, one definition would be the "maximum" field value where the radius of the ellipse is maximum. Another definition would be the rms value of the X and Y components. FIG. 4 illustrates three field ellipses each having the same rms value but with substantially different maximum field values. In this regard, the selected definition is more important for consideration of magnetic field values under the line where larger phase differences between X and Y components occur; whereas, the present concept is concerned with reduced magnetic field values along the edge of the transmission line right-of-way.

Figure 5:
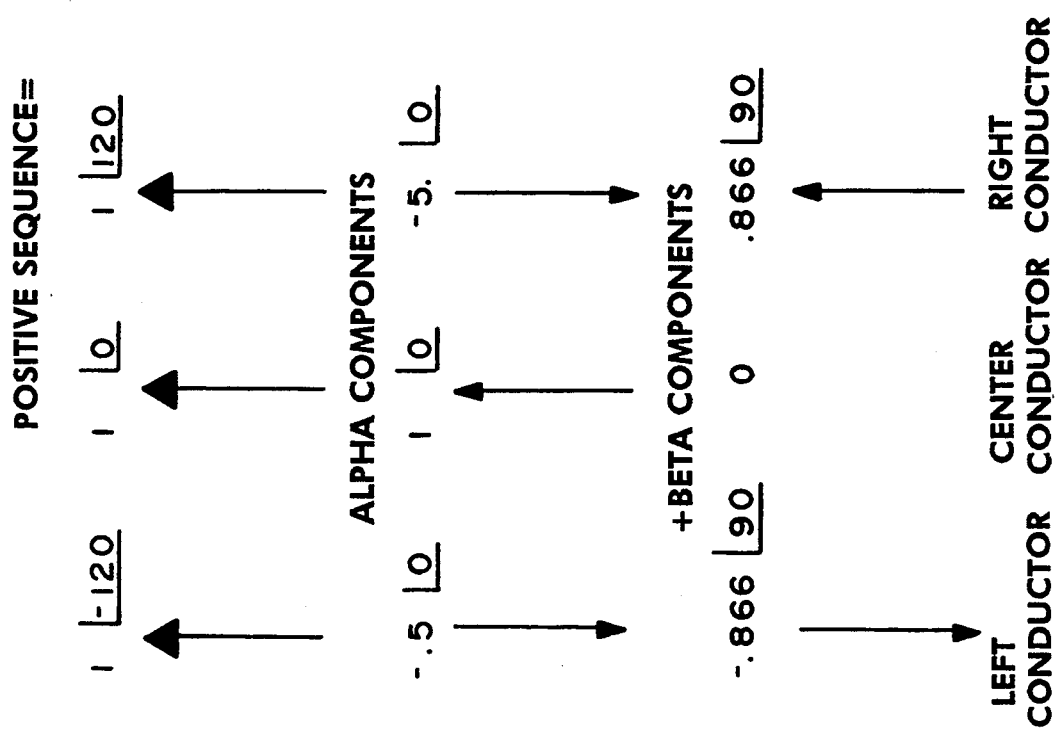
FIG. 5 illustrates the resolution of positive sequence current or voltage into alpha and beta components.

As detailed in *Circuit Analysis of AC Power Systems* by Edith Clarke, General Electric Company, 1961, for analytical purposes it is convenient to reduce positive sequence line current into two portions designated "alpha" and "beta" components. As illustrated in FIG. 5, the field vectors created by each such component is a constant direction line rather than an ellipse which allows for a better understanding with the basic phenomena dealing with the cancellation of magnetic fields. Although the magnetic field created by positive sequence, alpha mode, or beta mode currents at a point quite remote from the line is not significant since the sum of the instantaneous phase currents is zero, the resulting field is significant when the distance from the center line is less than 1 or 2 orders of magnitude of the interphase spacing.

Figure 6:
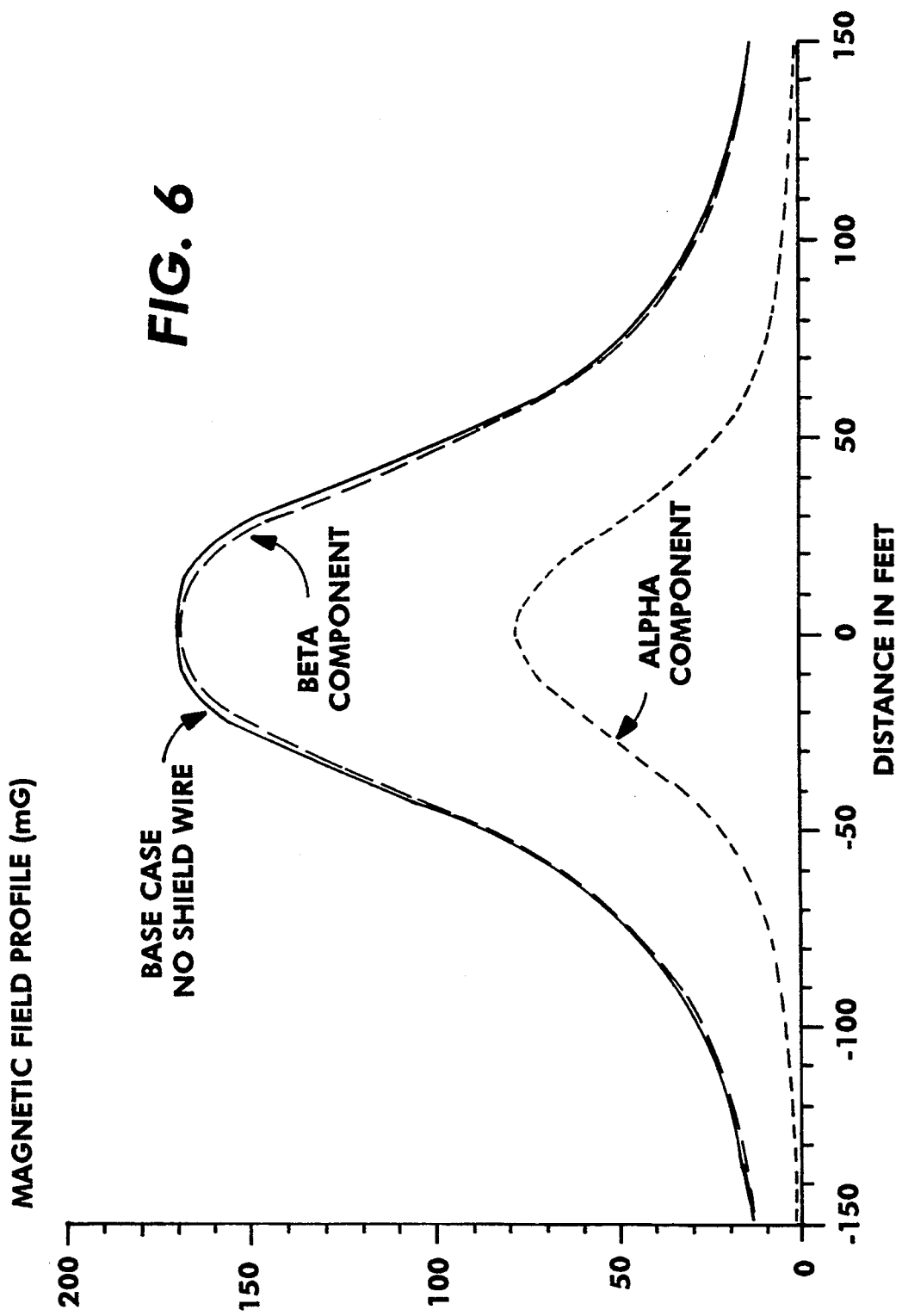
FIG. 6 illustrates the effect of the decomposition of the positive sequence currents or voltages into alpha and beta components.
Figure 7:
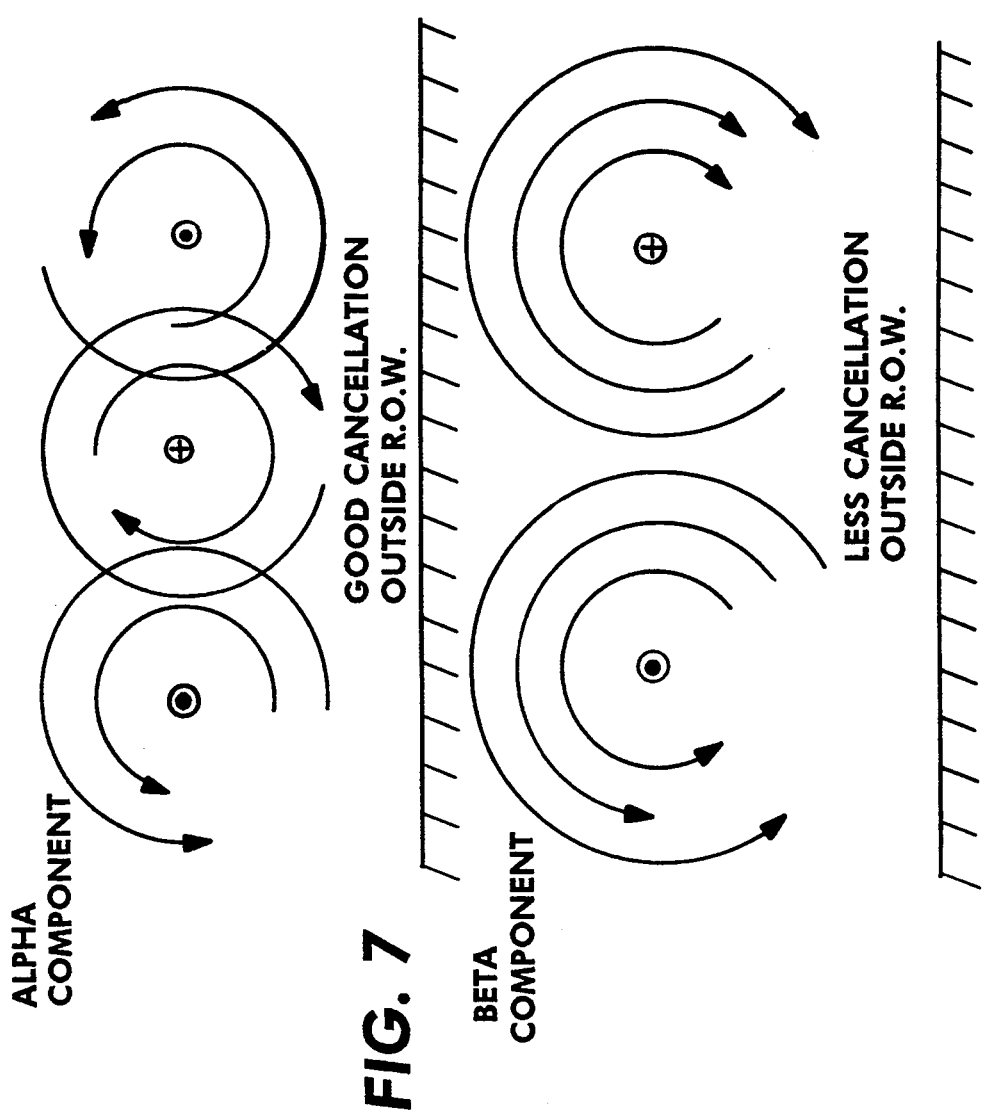
FIG. 7 illustrates the dominance of the field created by the beta component, as well as the need for a shielding scheme directed toward the cancellation of beta component magnetic fields.

From a consideration of FIG. 6, the relative magnetic field magnitude profiles of the alpha and beta components may be seen. Such profiles are based upon the maximum radii of the ellipse. As is apparent, the total field created by a positive sequence line current of 1000 amperes, for example, is dominated by the field created by the beta component. Moreover, due to the greater effective spacing between current carrying conductors and the bipolar versus coaxial configuration, as illustrated in FIGS. 5 and 7, for example, the field of the beta component shown in FIG. 6 additionally drops off more slowly than that of the alpha component. Similar profiles are obtained when plotting rms field magnitudes.

Figure 8:
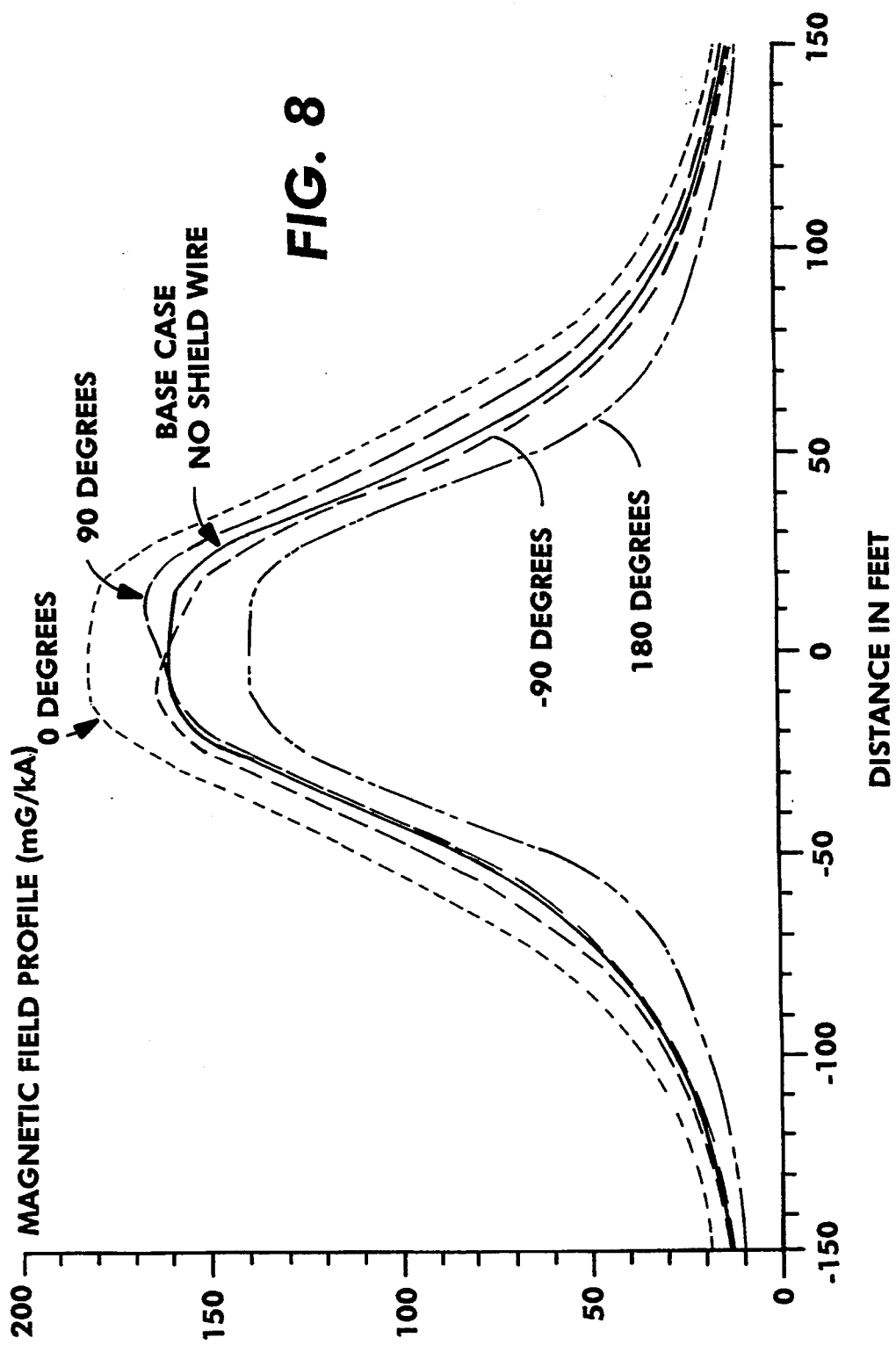
FIG. 8 illustrates the effect of varying the phase angle of a 100 ampere current source in the shield circuit with the angles measured with respect to the beta current component of an adjacent phase.

A shield circuit, as previously described, provides a path in which a "reverse" beta component current can flow. Such reverse flow creates a magnetic field in opposition to the magnetic field created by the beta current component of the transmission line. Such field cancellation may be seen from a consideration of FIGS. 8 and 9 which show calculated magnetic field profiles produced by currents forced to flow in the shield circuit by ideal current sources. In FIG. 8, for example, with a 100 ampere current source at various phase angles with respect to the adjacent phase beta current, it may be seen from the profile that maximum cancellation is obtained for an injected shield circuit phase angle of 180° out of phase with the adjacent phase beta current. As will also be noted from a consideration of the illustrated profiles, the worst case is obtained with a phase angle of 0° where the resultant field is even greater than the base case with no shield wire in place.

Figure 9:
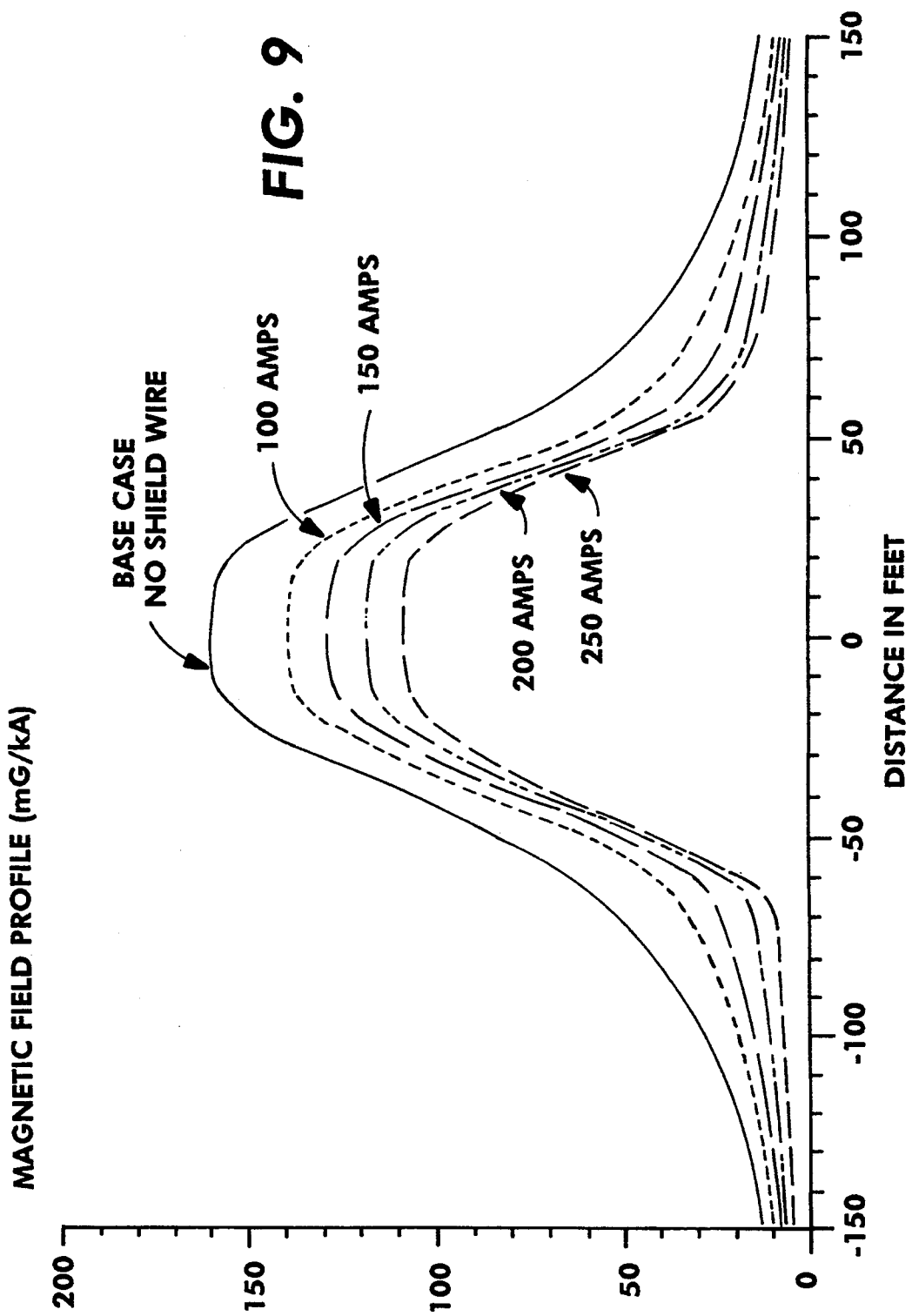
FIG. 9 illustrates the effect of varying a current source magnitude in the shield circuit with the phase angle maintained at 180°.

Consideration of the profiles illustrated in FIG. 9, indicate that where the phase angle is fixed at 180° and the shield wire current magnitude is varied from 100 amperes to 250 amperes, the effective field cancellation increases with increasing shield circuit current. As will be further noted, with 250 amps flowing in the shield circuit there is a reduction of 82% on one side of the transmission line near the right-of-way edge, and a 68% reduction on the other side. Such asymmetry is due to an imbalance in the power circuit which includes negative and zero sequence components. To a lesser extent, the asymmetry is due to the currents induced in the transmission line ground wires GW.

Mutual inductance between the transmission line and the shield circuit produces a voltage in the longitudinal portions of the latter which is proportional to the phase current. With the illustrated closed shield circuit loop of FIG. 1, for example, the shield circuit current would equal the magnitude of the induced voltage divided by the loop impedance. With pure positive sequence flow in the transmission line phase conductors, the phase angle of the open circuit voltage induced in the shield loop leads the desired shield circuit current phase angle by approximately 90°. Thus an ideal shield circuit having no resistance and having a purely inductive loop impedance would cause the current phase angle of the shield circuit to be optimum for magnetic cancellation. However, since the actual shield current magnitude is constrained by the loop impedance including resistance, the shielding effect should be enhanced by compensation for some of the inductance.

Figure 10:
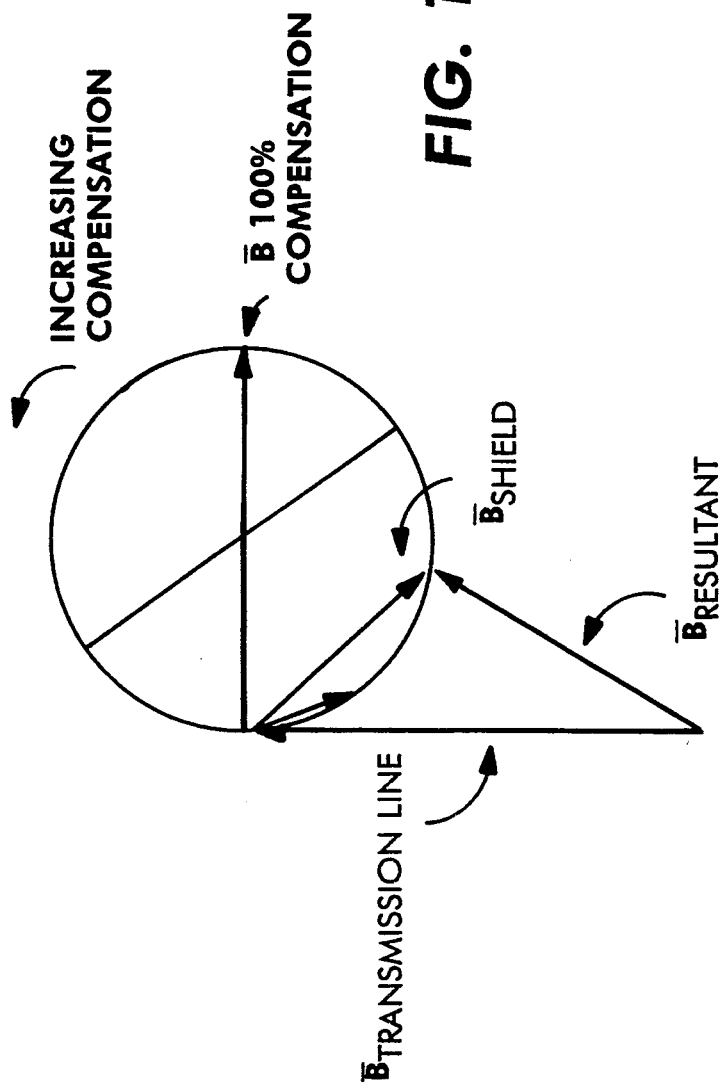
FIG. 10 is an analytical approach illustrating that the shielding effect of the disclosed circuit can be enhanced by compensating some of the inductance of the loop impedance through the use of a series capacitor in the shield circuit.

Such results are obtained by the inclusion of the aforementioned series capacitor in the shield circuit. The capacitor, of course, cannot eliminate shield wire resistance, and as more compensation is added by way of larger capacitors, the impedance angle of the circuit decreases as the resistance becomes a larger portion of the net impedance. Under such circumstances the induced shield circuit current magnitude increases; however, the phase angle becomes less favorable. An analytical aid useful for illustrating this phenomenon is shown in FIG. 10, where with circuit compensation varied from infinite inductive reactance to infinite capacitive reactance, the magnetic field phaser for the shield current describes a circle. With no added compensation the phaser touches the circle at an angle below the horizontal which is equal to the inherent impedance angle of the shield circuit which is approximately 80°. The net magnetic field phaser measured from the origin to the end of the shield circuit phaser would first decrease and then increase as the net reactance reaches 0 or 100% compensation. As will also be noted from the diagram, the minimum net field magnitude is obtained with a moderate amount of capacitive compensation.

As will be appreciated by the artisan, the diameter of the shield field circle increases inversely with the resistance. Accordingly, better cancellation can be achieved with a reduced shield circuit resistance combined with the optimum degree of capacitive compensation. As a practical matter, the size, resistivity and length of the shield wire will be determined by factors as topography, cost, etc., and the size of the capacitive compensation will be selected so as to adjust the self-impedance of the shielding circuit such that the magnitude and phase of the shield circuit current will create the maximum cancelling magnetic field, thereby reducing the net magnetic field magnitude in a given area or location along the edge of a right-of-way.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A shielding circuit for mitigating electric and electromagnetic fields produced by power transmission lines along longitudinal edges of a transmission line right-of-way, said shielding circuit comprising:

wire conductor means located adjacent and substantially parallel to said power transmission lines along each said edge of the right-of-way, said wire conductor means being electrically insulated from said transmission lines and positioned above ground between said transmission lines and the edges of said right-of-way;

said conductor means including wire means connected to said wire conductor means for forming a loop extending along at least a portion of said power transmission lines along their length;

means for connecting said wire conductor means to ground;

reactive compensating means connected in circuit with said wire conductor means for compensating for the self-impedance of said shielding circuit such that the magnitude and phase of the current induced in said shield circuit creates cancelling fields thereby substantially reducing the net electric and electromagnetic fields along at least a portion of each of the right-of-way edges.

2. A shielding circuit as in claim 1 wherein said wire conductor means forms a loop along substantially the entire length of the power transmission lines.

3. A shielding circuit as in claim 2 wherein said compensating means includes a capacitor means sized to provide optimum reactance at the power line fundamental frequency to produce substantially maximum cancellation of said electromagnetic field along said right-of-way edges.

4. A shielding circuit as in claim 1 wherein said transmission line is a three phase power transmission line.

5. A shielding circuit as in claim 4 wherein said compensating means includes a capacitor means sized to provide optimum reactance at the power line fundamental frequency to produce substantially maximum cancellation of said electromagnetic field along at least a portion of said right-of-way edges.

6. A shielding circuit as in claim 5, wherein
said means for connecting to ground is positioned near the longitudinal midpoint of one side of said right-of-way, and
said capacitor means is positioned electrically opposite said means for connecting to ground, at a point near the longitudinal midpoint of the opposite side of said right-of-way.

7. A shielding circuit as in claim 1 wherein said compensating means includes a capacitor means sized to provide optimum reactance at the power line fundamental frequency to produce substantially maximum cancellation of said electromagnetic field along at least a portion of said right-of-way edges.

8. A shielding circuit as in claim 7 wherein said capacitor means includes an overvoltage limiting device.

9. A shielding circuit as in claim 1 wherein said means for connecting includes a current limiting impedance.

10. A method of partially cancelling the electric and electromagnetic fields created by current flow through polyphase transmission lines thereby reducing the net fields created by such lines along the edges of a right-of-way, said method comprising:
locating above ground wire conductors adjacent and substantially parallel to said transmission lines along each said edge of the right-of-way so as to be positioned between said transmission lines and the edges of said right-of-way;
connecting said wire conductors with additional wire conductors to form a conductive loop extending along at least a portion of said transmission lines along the length of said right-of-way;
connecting a capacitor in said loop;
connecting said loop to ground; and
sizing said capacitor to have a capacitive reactance at the fundamental frequency of said transmission lines such that the net loop impedance to current induced in said loop is optimized so as to produce substantially maximum opposition to the magnetic field created by said transmission lines.

11. A method as in claim 10 wherein said loop extends along substantially the entire length of said transmission lines.

12. A method as in claim 10 wherein said capacitor is a bank of capacitors.

13. A method as in claim 10 further including the step of providing said capacitor with an overvoltage limiting device.

14. A method as in claim 10 further including the step of providing said loop to ground connection with a current limiting impedance.

15. A method as in claim 10, wherein
said loop is connected to ground at a position near the longitudinal midpoint of one side of said right-of-way, and
said capacitor is connected in said loop at a position near the longitudinal midpoint of the opposite side of said right-of-way.

16. A passive shielding circuit for partially cancelling the electric and electromagnetic fields created by current flow through above ground polyphase transmission lines thereby reducing the net fields created by such lines along edges of an elongated right-of-way over which said polyphase lines extend, said circuit comprising:
wire conductors located adjacent and parallel to said transmission lines along at least a portion of each said edge of the right-of-way and positioned above ground between said transmission lines and ground;
said wire conductors including wire means connected to said conductors for forming a conductive circuit loop extending along said transmission lines along at least a longitudinal portion of said right-of-way;
a capacitor element connected to said wire conductors; and
at least one connector for connecting said wire conductors to earth ground, whereby the current induced in said shield circuit by said transmission lines produces substantially maximum opposition to the electromagnetic fields created by said transmission lines.

17. A passive shielding circuit as in claim 16 wherein said loop extends along substantially the entire length of said transmission lines.

18. A passive shielding circuit as in claim 17 wherein said capacitor element is sized to provide optimum reactance for said shield circuit loop at the fundamental frequency of said transmission lines so as to produce substantially maximum opposition to the electromagnetic fields created by said transmission lines along the edges of said right-of-way.

19. A shield circuit as in claim 18 wherein said capacitor element is a bank of capacitors.

20. A shield circuit as in claim 18 wherein said capacitor element includes an overvoltage limiting device.

21. A shield circuit as in claim 17 wherein said conductive loop is insulated from said power lines and is connected to earth ground at one or more points.

22. A shield circuit as in claim 16 wherein said at least one ground connector includes a current limiting impedance.

23. A shield circuit as in claim 16, wherein
said at least one connector to ground is located near the longitudinal midpoint of one side of said right-of-way, and
said capacitor element is located near the longitudinal midpoint of the opposite side of said right-of-way.

* * * * *